(12) United States Patent
Esenwein et al.

(10) Patent No.: US 10,525,581 B2
(45) Date of Patent: Jan. 7, 2020

(54) HOUSING COVER FOR A HAND-HELD POWER TOOL

(71) Applicant: Robert Bosch GmbH, Stuttgart (DE)

(72) Inventors: Florian Esenwein, Leinfelden-Echterdingen (DE); Peter Stierle, Pliezhausen (DE); Manfred Lutz, Filderstadt (DE); Thomas Schomisch, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 15/775,985

(22) PCT Filed: Oct. 4, 2016

(86) PCT No.: PCT/EP2016/073601
§ 371 (c)(1),
(2) Date: May 14, 2018

(87) PCT Pub. No.: WO2017/102127
PCT Pub. Date: Jun. 22, 2017

(65) Prior Publication Data
US 2018/0319002 A1      Nov. 8, 2018

(30) Foreign Application Priority Data

Dec. 17, 2015   (DE) .......................... 10 2015 225 783

(51) Int. Cl.
*H02K 7/14*      (2006.01)
*B25F 5/00*      (2006.01)
(Continued)

(52) U.S. Cl.
CPC ............... *B25F 5/008* (2013.01); *H02K 5/10* (2013.01); *H02K 5/20* (2013.01); *H02K 7/145* (2013.01);
(Continued)

(58) Field of Classification Search
CPC . H02K 7/145; H02K 5/20; H02K 5/10; B25F 5/008; B25F 5/02; B24B 23/028; B25D 17/20; B25D 2217/0061; B25D 2217/0065
(Continued)

(56) References Cited

U.S. PATENT DOCUMENTS 3,365,597 A * 1/1968 Susumu .................... H02K 5/04
                                                      310/89
3,414,747 A * 12/1968 Badcock ................ H02K 1/185
                                                      310/50
(Continued)

FOREIGN PATENT DOCUMENTS

CH        345262 A      3/1960
DE        944976 C      6/1956
(Continued)

OTHER PUBLICATIONS

International Search Report corresponding to PCT Application No. PCT/EP2016/073601, dated Jan. 31, 2017 (German and English language document) (5 pages).

*Primary Examiner* — Thanh Lam
(74) *Attorney, Agent, or Firm* — Maginot, Moore & Beck LLP (57) ABSTRACT

A hand-held power tool includes an electric motor, a housing, and a housing cover. The housing includes an opening located in the vicinity of carbon brushes of the electric motor, such that the carbon brushes can be removed through the opening in the housing. The housing cover includes air inlets through which cooling air can flow into the interior of the housing. The opening in the housing is detachably closed by the housing cover.

14 Claims, 8 Drawing Sheets

(51) Int. Cl.
*H02K 5/20* (2006.01)
*H02K 5/10* (2006.01)
B24B 23/02 (2006.01)
B25D 17/20 (2006.01)

(52) U.S. Cl.
CPC ............ *B24B 23/028* (2013.01); *B25D 17/20* (2013.01); *B25D 2217/0061* (2013.01); *B25D 2217/0065* (2013.01)

(58) Field of Classification Search
USPC ...................................... 310/47, 50, 89, 228
See application file for complete search history.

(56) References Cited

U.S. PATENT DOCUMENTS

| | | | |
|---|---|---|---|
| 3,462,623 A * | 8/1969 | Batson | H02K 7/145 310/50 |
| 3,652,879 A * | 3/1972 | Plunkett | B25F 5/008 310/50 |
| 4,075,523 A * | 2/1978 | Lafferty, Sr. | H02K 5/148 310/239 |
| 4,219,749 A * | 8/1980 | Rettberg | H01R 39/40 310/50 |
| 6,294,857 B1 | 9/2001 | Nakane | |
| 7,888,838 B2 * | 2/2011 | Esenwein | H01R 43/14 310/219 |
| 9,956,659 B2 * | 5/2018 | Takeuchi | B23Q 11/0046 |
| 2003/0155142 A1 | 8/2003 | Kikuchi et al. | |

FOREIGN PATENT DOCUMENTS

| | | |
|---|---|---|
| DE | 6609573 U | 7/1972 |
| DE | 10 2006 023 039 B3 | 1/2008 |
| DE | 10 2008 000 828 A1 | 10/2009 |
| DE | 10 2009 026 516 A1 | 12/2010 |
| EP | 2946888 A1 | 11/2015 |
| GB | 2462938 A | 3/2010 |
| JP | 2002-283255 A | 10/2002 |
| JP | 2003260676 A | 9/2003 |
| JP | 2010-36260 A | 2/2010 |
| WO | 2009100821 A1 | 8/2009 |

* cited by examiner

HOUSING COVER FOR A HAND-HELD POWER TOOL

This application is a 35 U.S.C. § 371 National Stage Application of PCT/EP2016/073601, filed on Oct. 4, 2016, which claims the benefit of priority to Serial No. DE 10 2015 225 783.5, filed on Dec. 17, 2015 in Germany, the disclosures of which are incorporated herein by reference in their entirety.

BACKGROUND

The disclosure relates to a hand-held power tool.

An electric hand-held tool with a cover element is known from DE 2006023 039. The electric hand-held tool has a housing which consists of two longitudinal shells in which a motor is arranged. One of the longitudinal shells has a cut-out in which a one-piece or multi-piece cover element can be removably accommodated. The cut-out is arranged so that with the cover element removed the carbon brushes of the motor and/or the electronics is/or accessible.

SUMMARY

Ensuing from the prior art is the object of providing an electric hand-held tool which provides an improved cooling system.

The disclosure relates to a hand-held power tool with a housing and a motor, especially an electric motor. The hand-held power tool can be designed as, inter alia, a drilling machine, percussion drill, grinding machine, miller, power saw and especially as an angle grinder. The motor is designed for the purpose of driving a drive shaft. The hand-held power tool also has a tool which can be connected by way of example via a transmission to the drive shaft of the electric motor. The housing of the hand-held power tool is designed especially as an outer housing. The housing can consist of a plurality of housing elements, such as a motor housing element, a brush cover housing element, a housing rear part element, housing nose cover or a housing gripping element. The housing is especially designed in the main for the purpose of accommodating, supporting, positioning or fixing the electric motor, the mechanism, the electronics, switches and output shaft of the hand-held power tool. In particular, an outer housing protects said internal components from an unwanted access of a user. Specific housing parts, such as the housing gripping element, are preferably designed for the purpose of providing a gripping region for the user. The housing elements can be interconnected, especially in a detachable manner, via connecting elements. For example, the connecting of the housing parts can be carried out via a snap-in connection, a screwed connection, undercuts or by means of a connection via an adhesive fastening means etc.

The electric motor, especially a universal motor, comprises at least one carbon brush, especially two carbon brushes, which is/are designed for the purpose of making an electrical contact with a collector of the electric motor. The carbon brush can especially be arranged between the motor housing element and the housing gripping element. In the case of industrially used carbon brushes it is usual that wear can occur, which requires an exchange of the worn carbon brushes with new carbon brushes. For this reason, the carbon brushes are detachably arranged inside the housing and can be removed via a housing opening. The housing has a cover for covering the opening, wherein the housing cover is designed as a detachable part of the housing. The housing cover is especially designed as a brush cover.

Furthermore, the housing cover of the hand-held power tool according to the disclosure has at least one air inlet opening which is designed for supplying the electric motor with cooling air. The air inlet openings can be designed as a passage opening in the housing cover with various geometric shapes, for example rectangular, spherical, sail-shaped or circular. The shape of the housing cover can by way of example be of planar or slightly curved design. The housing cover advantageously terminates in the housing opening flush with the housing so that no projection or recess is created at the position of the housing cover. The air inlet openings can in the main be advantageously arranged along, or radially in relation to, the longitudinal axis of the hand-held power tool, which can result in an improved cooling air feed.

Furthermore, at least one filter element can be arranged at the air inlet opening, which filter element is designed for the purpose of preventing ingress of material particles and dust into the housing of the hand-held power tool. The number of filter elements can advantageously correspond to the number of air inlet openings. Alternatively, it is also conceivable that one filter element extends over a multiplicity of air inlet openings. A filter element is particularly advantageously allocated to each air inlet opening. The filter element can consist of a fabric, plastic element or another material which is designed for the purpose of acting as a separating layer. Material particles, dust or comparable contaminants of the cooling air are trapped by the filter element and prevent entry into the interior of the housing. The filter element is advantageously of permeable design for cooling air. Especially to be understood by permeable for cooling air is that the filter element is designed to be penetrable for cooling air and/or for an air flow and in the main to be dust-tight. The filter element can be arranged on the housing cover on the inside and/or on the outside, and also be let into the housing cover.

The filter element can also be designed to be fastened on the housing cover in a detachable manner, especially by clipping in or by adhesive fastening. Material particles and dust which are separated from the cooling air by the filter element can collect on the filter element. With advanced covering of the filter element with material particles or dust this can cause the cooling air flow which is drawn in through the air inlet openings, and therefore also the cooling capacity, to be reduced. In order to regenerate the filter element again, it is conceivable to use a cleanable filter material. Alternatively, the filter element can be exchanged.

Furthermore, the at least one air inlet opening is arranged in the vicinity, especially in the immediate vicinity, of the carbon brushes, especially radially on the outside. Radially on the outside is especially to be understood as being radially to the longitudinal axis of the electric motor which is associated with the carbon brushes. This has the advantage that the air inlet openings are arranged spatially close to the electric motor and therefore a sufficient supply of the electric motor with cooling air can be ensured.

The housing cover can be releasably connected to the housing by means of at least one fastening element, for example a screw and/or a snap-in element. The releasable connecting of the housing cover to the housing of the hand-held power tool can be carried out by the fastening element, by means of for example a screwed connection, a snap-in connection or via a connection as is disclosed in document DE 10 2006 023 039 B3. The fastening element can be designed to be released just using a tool, especially a screwdriver.

The housing cover can comprise a cover element for fastening the housing cover to the housing of the hand-held power tool and a filter element which is designed to be releasably connected to the cover element. An at least two-piece construction of the housing cover has the advantage that removing the filter retaining element, for example in order to regenerate or exchange the filter element, does not release the cover element from the hand-held power tool and therefore the internal components are still at least partially protected from intrusion of the user. The fastening element of the housing cover is especially designed as a fastening element of the cover element. The fastening element of the cover element to the hand-held power tool is advantageously designed to be released solely by using a tool, for example a screwdriver, whereas the fastening element of the filter retaining element to the cover element is advantageously designed to be also manually released, especially without a tool.

The cover element and the filter retaining element can both feature air inlet openings. As a result of these measures, it can be ensured that the electric motor is supplied with sufficient cooling air.

The filter element can especially be accommodated between the filter retaining element and the cover element, especially in a detachable manner. The filter element can preferably be arranged radially on outside on the cover element and radially on the inside on the filter retaining element. The filter element can especially be attached to the filter retaining element, for example by adhesive fastening or by clipping in. The cooling air, on its way into the interior of the housing of the hand-held power tool, advantageously flows through at least one filter element.

The filter retaining element of the housing cover can also be designed in one piece with the cover element of the housing cover. This enables a compact construction of the housing cover. In this alternative embodiment, the filter element can advantageously be arranged on the side facing the hand-held power tool.

Furthermore, the hand-held power tool can with a housing, an electric motor with at least one carbon brush which is designed for the purpose of making an electrical contact with a collector of the electric motor, wherein the carbon brush is detachably arranged inside the housing and can be removed via a housing opening, a housing cover for covering the housing opening, wherein the housing cover be designed as a detachable part of the housing, wherein the housing cover is especially of a one-piece design with a filter carrier attachment. To be understood by a filter carrier attachment is especially an attachment element which is advantageously arranged on the outer housing in a contour-matched manner. The filter carrier attachment can be arranged at least partially over an air inlet opening of the housing of the hand-held power tool. The filter carrier attachment comprises at least one air passage opening and at least one filter element. The air passage opening of the filter carrier attachment can be positioned over an air inlet opening of the hand-held power tool in such a way that cooling air can flow via the air passage opening and the air inlet opening into the housing of the hand-held power tool. The filter element can advantageously be arranged in such a way that the cooling air, on its way into the hand-held power tool, flows through the filter element. The housing cover with the filter carrier attachment can be detachably connected to the hand-held power tool via the fastening element of the housing cover. Furthermore, it is conceivable that the filter carrier attachment can have additional fastening element. These additional fastening elements can by way of example be screws or snap-in elements.

BRIEF DESCRIPTION OF THE DRAWINGS

Further advantages are gathered from the following drawing description. Exemplary embodiments of the disclosure are represented in the drawings. The drawing, the description and the claims contain numerous features in combination. The person skilled in the art will expediently also consider the features individually and combine them to form practical further combinations.

DETAILED DESCRIPTION

Figure 1:
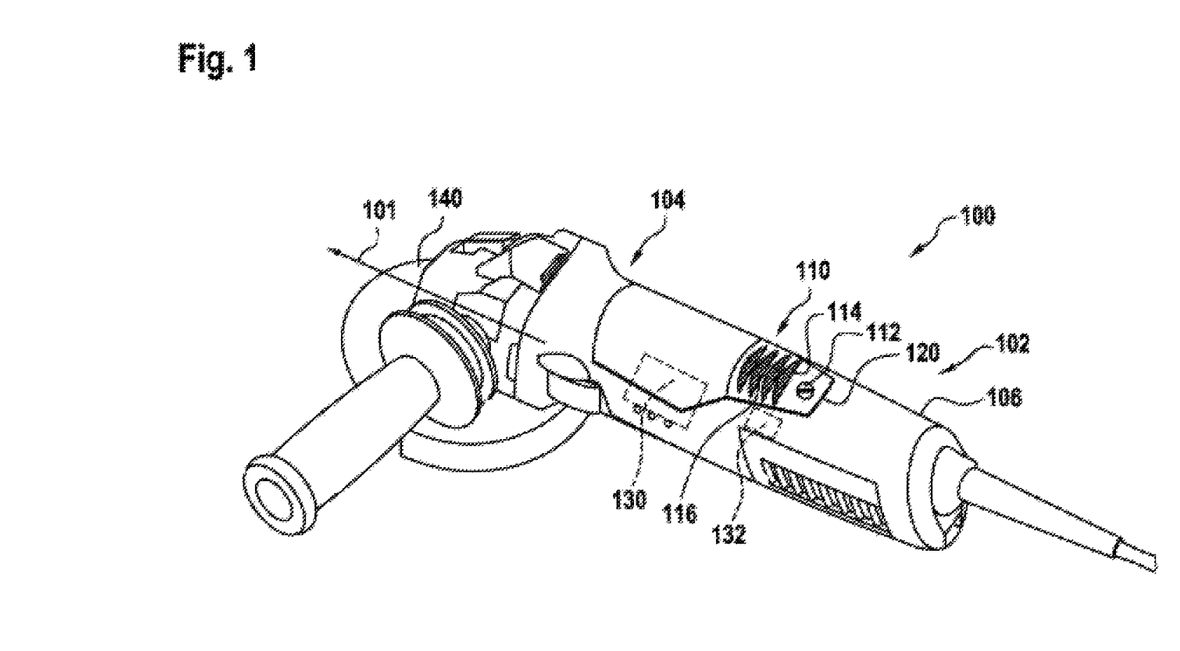
FIG. 1: shows a perspective view of a hand-held power tool according to the disclosure with a housing cover.
Figure 2:
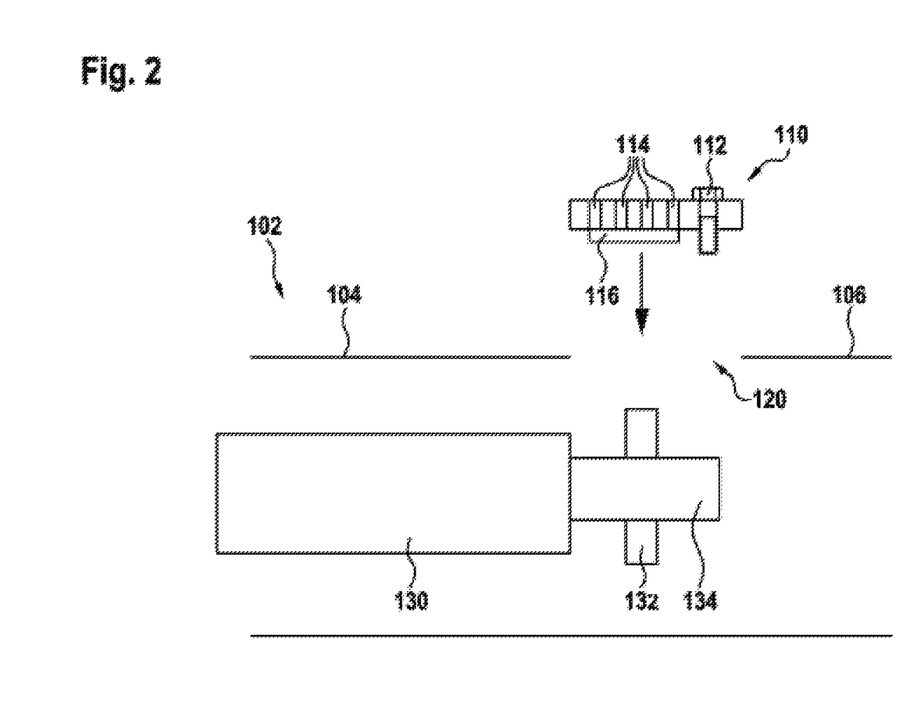
FIG. 2: shows in schematic view a detail from a side view of a hand-held power tool according to the disclosure with a housing cover.
Figure 3:
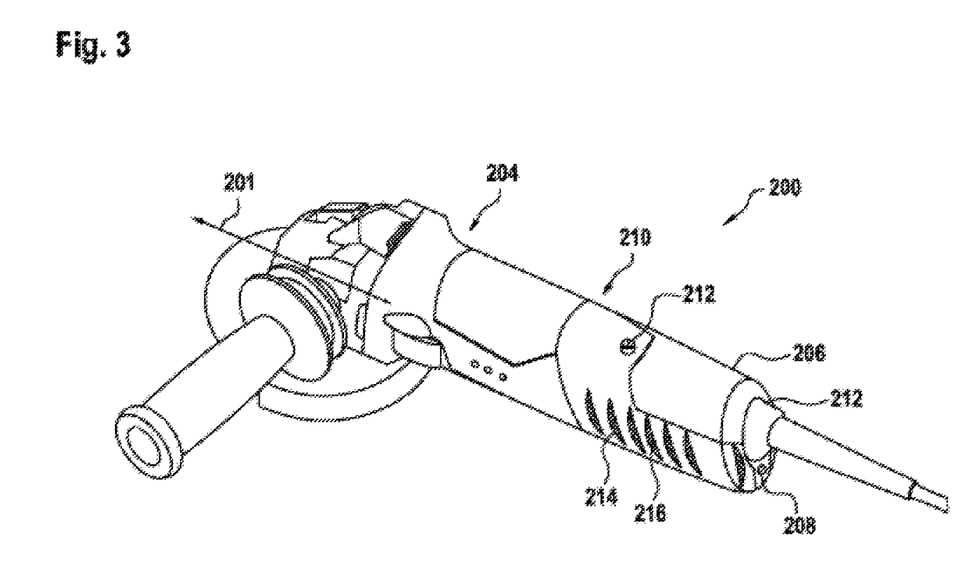
FIG. 3: shows an alternative embodiment of the hand-held power tool according to the disclosure with a housing cover.

Shown in FIG. 1 is a perspective view of a hand-held power tool 100 according to the disclosure with a housing cover 110, and shown in FIG. 2 is a detail of a side view of the hand-held power tool 100 according to the disclosure with the housing cover 110. The hand-held power tool 100 is by way of example designed as an angle grinder. The hand-held power tool 100 comprises an electric motor 130 with a collector 134, which on its collector-side end has a carbon brush 132. The hand-held power tool 100 has an angular gear, not shown in more detail, which is designed for the purpose of transmitting torque from the electric motor 130 to a tool 140. The housing 102 of the hand-held power tool 100 has by way of example a motor housing element 104, a housing rear part element 106 and a housing cover 110. The housing cover 110 is detachably connected to the motor housing element 104 of the hand-held power tool 100 via a fastening element 112, which by way of example is formed as a screw. The housing cover 110 is arranged in a housing opening 120. The housing cover 110 is arranged in the housing opening 120 of the housing 102 basically in a precisely fitting manner and basically free from play. The housing cover 110 has a basically trapezoidal shape. The housing opening 120 is arranged in such a way that the carbon brush 132 can be removed via the housing opening 120. By way of example, the housing opening 120 is arranged radially to the longitudinal extent of the electric motor 130 at least partially over the carbon brush 132. The housing cover 110 has four air inlet openings 114 which are designed as an access for cooling air into the interior of the housing 102. The air inlet openings 114 of the housing cover 110 are by way of example arranged in the main in the radial direction in relation to the longitudinal extent 101 of the electric motor 130 at least partially over the carbon brush 132. Allocated to the air inlet openings 114 are filter elements 116 which are designed for the purpose of retaining dust and material particles and preventing ingress of dust and material particles into the interior of the housing 102. The filter elements 116 are by way of example arranged in and/or at the air inlet openings 114. Shown in FIG. 3 is an alternative embodiment of the hand-held power tool 200 according to the disclosure with a housing cover 210. In this alternative embodiment, the housing cover 210 extends against the longitudinal extent 201 of the hand-held power tool 200. By way of example, the housing cover 210 is arranged axially between the motor housing 204 and a housing nose cover 208. The air inlet openings 214 are by way of example arranged at the side and on the rear side 222 of the hand-held power tool and designed with at least one filter element 216. The releasable fastening of the housing cover 210 to the hand-held power tool 200 is carried out via at least one fastening element 212, especially a screw.

Figure 4:
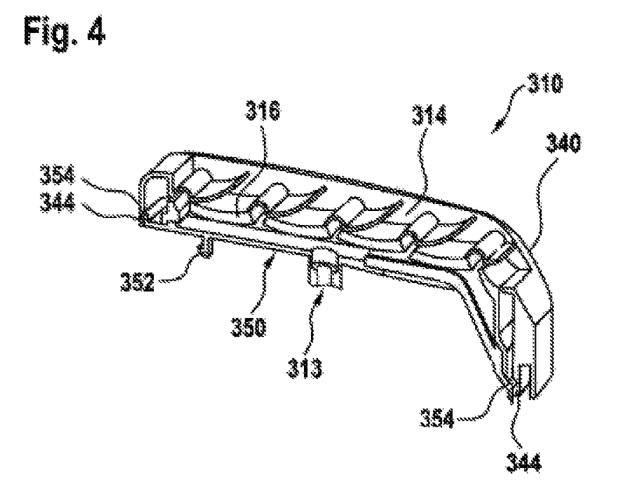
FIG. 4: shows a side section of a further embodiment of the housing cover of the hand-held power tool according to the disclosure.

Shown in FIG. 4 is an alternative embodiment of the housing cover 310 which is designed to be connected to the housing 102 of the hand-held power tool 100. The housing cover 310 in this alternative embodiment comprises a filter retaining element 340 with air inlet openings 314, at least one filter element 316 and a cover element 350. The cover element 350 has air inlet openings, not shown in more detail, and at least one fastening element, not shown in more detail, especially a fastening screw. The fastening element can by way example be accommodated in a screw boss 313 and is designed for the purpose of connecting the cover element 350 of the housing cover 310, via a screwed connection, to a housing of a hand-held power tool (not shown). The cover element 350 advantageously has by way example a second fastening means 352 in the form of a locking lug which is designed to be connected to a corresponding geometry in the hand-held power tool. Furthermore, the cover element 350 is designed with form-fitting elements 354 which are provided for the detachable fastening of the cover element 350 to the filter retaining element 340. The connecting is carried out by means of a form fit of the form-fitting elements 354 of the cover element 350 with corresponding form-fitting elements 344 of the filter retaining element 340. The filter retaining element 340 has air inlet openings 314. The air inlet openings 314 of the filter retaining element 340 are preferably arranged in such a way that a cooling air flow through the air inlet openings 314 of the filter retaining element 340 and the air inlet openings of the cover element 350 can enter the interior of a housing of the hand-held power tool. The housing cover 310 also has a filter element 316 which in the main is enclosed by the cover element 350 and the filter retaining element 340.

Figure 5:
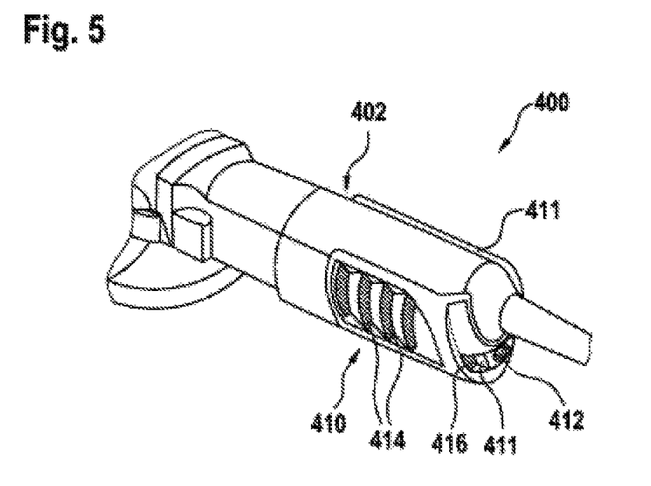
FIG. 5: shows a perspective view of a filter carrier attachment, fastened to the housing of the hand-held power tool.

Shown in FIG. 5 is a filter carrier attachment 410 for a hand-held power tool 400. The filter carrier attachment 410 is designed to be detachably connected to the housing 402 of the hand-held power tool. The filter carrier attachment 410 comprises a filter carrier element 411. The filter carrier element 411 is by way of example made from a plastic material and encloses the hand-held power tool 400 at least partially at the side and at least partially at the rear. The filter carrier element 411 has air passage openings 414 which are preferably arranged over air inlet openings (not shown) in the housing 402 of the hand-held power tool. Filter elements 416 are especially provided in and/or at the air passage openings 414. The contour of the filter carrier element 411 of the filter carrier attachment 410 is advantageously matched to the contour of the housing 402 of the hand-held power tool 400. The filter carrier attachment 410 has a connecting element 412 which is provided for the purpose of creating a connection of the filter carrier attachment 410 to the hand-held power tool 400. The connecting element 412 is preferably arranged spatially in the vicinity of a securing element of the housing 402 of the hand-held power tool 400. As a securing element (not shown) of the housing 402, a screw fastening of a housing nose cover is used by way of example in FIG. 5. The connecting element 412 of the filter carrier attachment 410 is by way of example designed as an opening or a hole. The hole is arranged in the main over the securing element of the housing 402 in the form of a screwed connection of the housing 402. Therefore, via a common securing element of the housing 402 both the housing element, in the form of a housing nose cover, and the filter carrier attachment 410 can be connected to the hand-held power tool 400.

Figure 6:
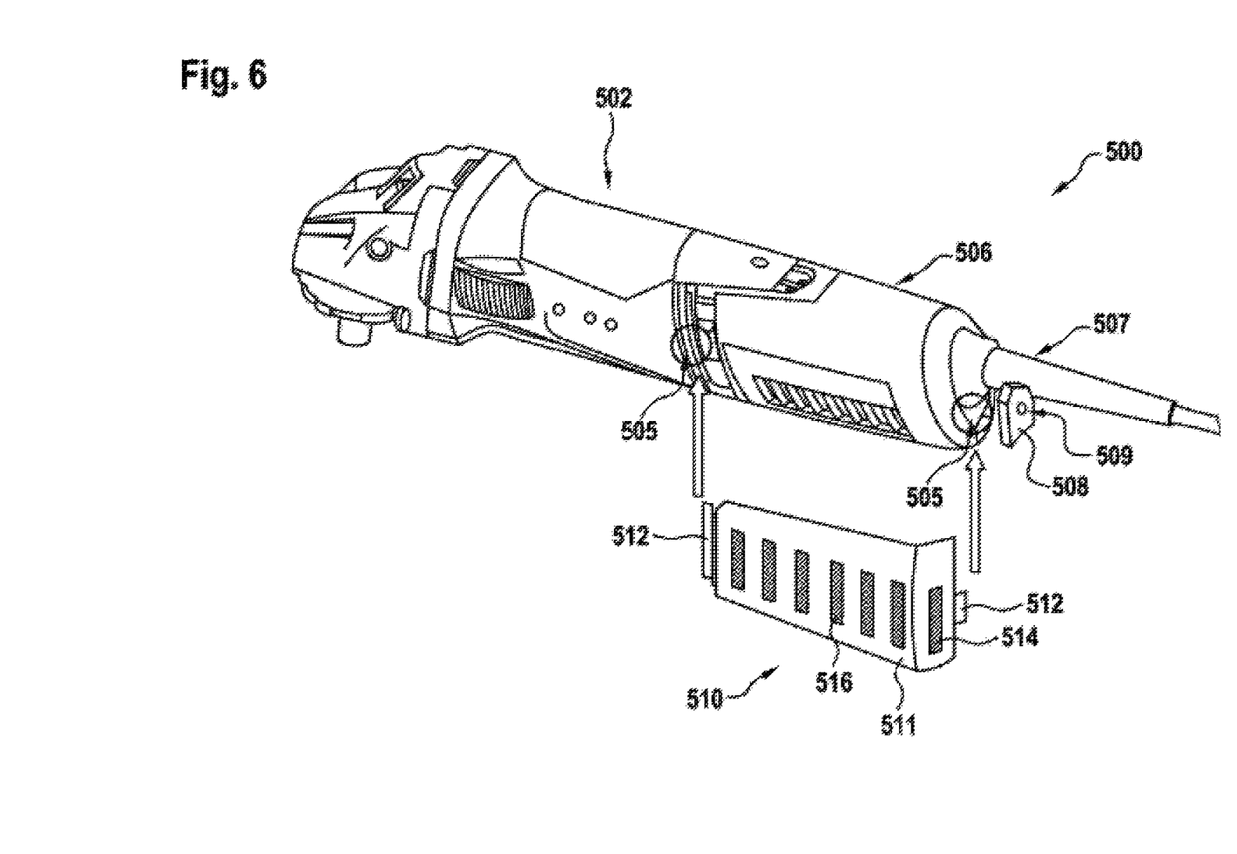
FIG. 6: shows a perspective view of an alternative embodiment of a filter carrier attachment, fastened to the housing of the hand-held power tool.
Figure 7:
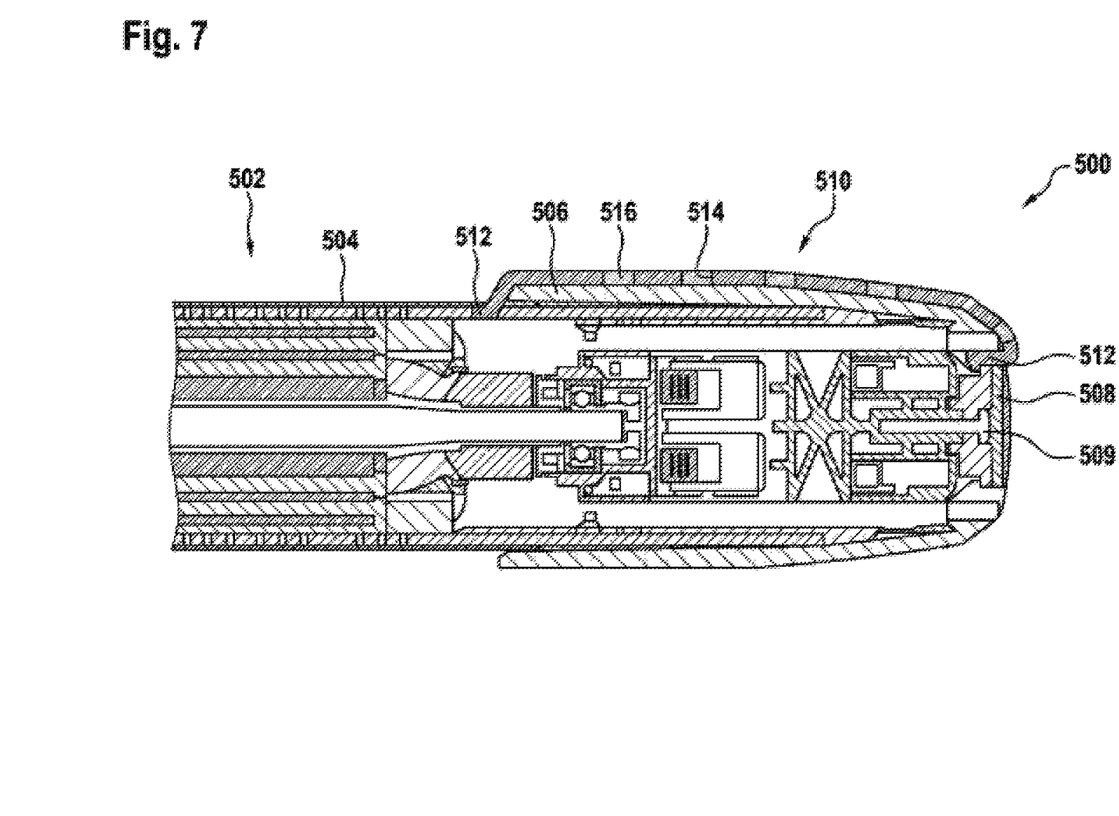
FIG. 7: shows a longitudinal section of the alternative embodiment of a filter carrier attachment, fastened to the housing of the hand-held power tool.
Figure 8A:
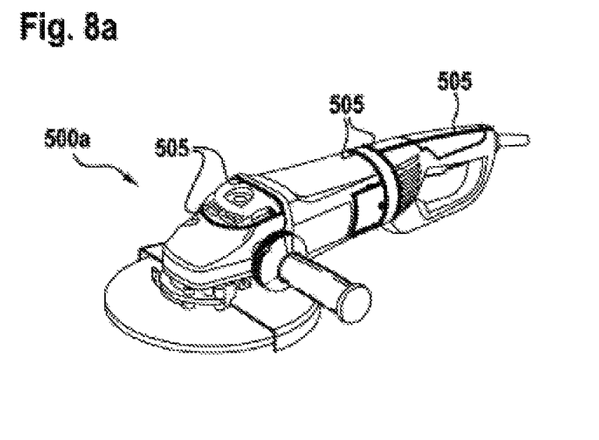
FIG. 8*a*: shows a perspective view of an angle grinder.
Figure 8B:
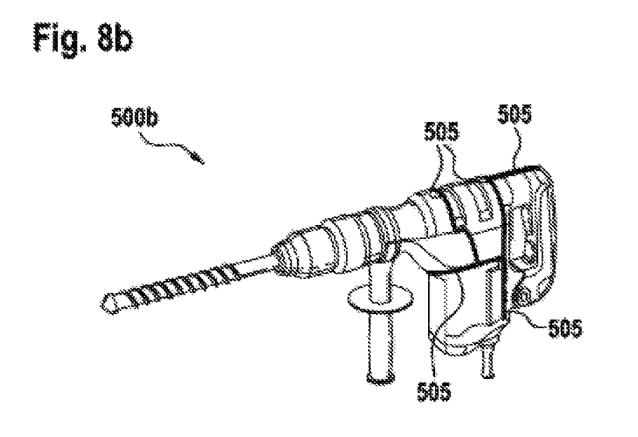
FIG. 8*b*: shows a perspective view of a hammer.
Figure 8C:
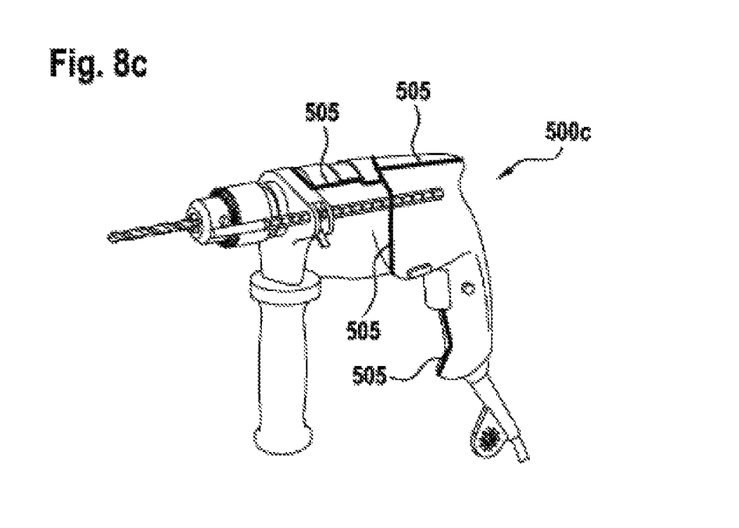
FIG. 8*c*: shows a perspective view of an alternative embodiment of a hammer.
Figure 8D:
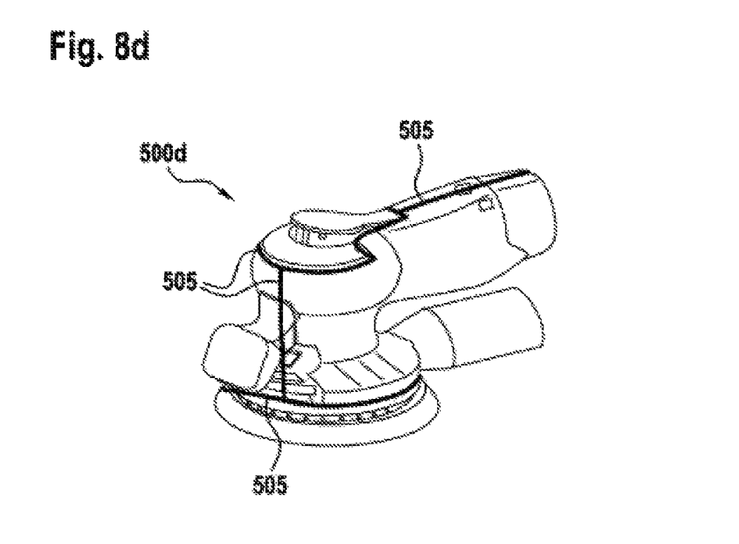
FIG. 8*d*: shows a perspective view of an eccentric grinder.

Shown in FIGS. 6 and 7 is an alternative embodiment of a filter carrier attachment 510 for a hand-held power tool. The housing 502 of the hand-held power tool 500 comprises a plurality of housing elements such as a motor housing 504, a housing rear part element 506 and a housing nose cover element 508, which are designed to be detachably fastened to the housing 502 of the hand-held power tool 500. The fastening is carried out at least partially via a securing element 509 in the form of a receiving opening for a screwed connection in the housing nose cover element 508. Between the motor housing 504 and the housing rear part element 506 and also between the housing rear part element 506 and the housing nose cover element 508, the housing 502 has a gap 505 in each case. If the housing elements of the housing 502 are in the connected state, then the housing gap 505 is basically designed to be closed, but not visually discernible. The filter carrier attachment 510 comprises a filter carrier element 511 and at least one air inlet opening 514 to which filter elements 516 are allocated. The filter carrier attachment 510 advantageously has at least one connecting element 512 which is designed for the purpose of creating a releasable connection to the housing 502 of the hand-held power tool 500. The connecting element 512 is by way of example designed as a retaining element. In the connected state, as shown in FIG. 7, the filter carrier attachment 510 is retained and positioned in the housing gaps 505 via the retaining elements 512 and secured via the securing element 509 of the hand-held power tool, in which a screw engages.

Shown in FIGS. 8a to 8d are possible arrangements of housing gaps 505 for different hand tools. A filter carrier attachment 510 by means of at least one connecting element 512 can therefore be attached to the housing 502 of the hand-held power tool 500a, 500b, 500c, 500d at basically all positions.

The following contain further exemplary embodiments of the present teachings, but are not limited thereto:

1. In one embodiment, the hand-held power tool 400 can be designed with a filter carrier attachment 410, wherein the hand-held power tool 400 has a housing 402 which is connected via at least one securing element to the hand-held power tool 400, wherein the filter carrier attachment 410 has at least one filter carrier element 411 with at least one air inlet opening 414 and at least one filter element 416 which is allocated to the air inlet opening 414, wherein the filter carrier attachment 410 has at least one connecting element 414 which, interacting with the at least one securing element of the housing 402, is designed for the purpose of detachably fastening the filter carrier attachment 410 to the housing 402 of the hand-held power tool 400.

2. In a further embodiment, the hand-held power tool 400, with a filter carrier attachment 410 according to 1, can be designed in such a way that the connecting element 414 is designed as a receiving opening for a screw fastening.

3. In a further embodiment, the hand-held power tool 400, with a filter carrier attachment 410 according to 1. and 2, can be designed in such a way that the contour of the filter carrier attachment 410 is in the main matched to the contour of the housing 402 of the hand-held power tool 400.

4. In a further embodiment, the hand-held power tool 400, with a filter carrier attachment 410 according to 3, can be designed in such a way that the securing element of the housing 402 is designed as a screw which connects a housing nose cover element to the hand-held power tool.

5. In a further embodiment, the hand-held power tool 400, with a filter carrier attachment 410 according to 4, can be designed in such a way that the filter carrier attachment 410 encloses the hand-held power tool at least partially at the side and at least partially at the rear.

6. In an alternative embodiment, the hand-held power tool 500 with a filter carrier attachment 510, wherein the hand-held power tool 500 has a housing 502 which is connected via at least one securing element 509 to the hand-held power tool 500, wherein the filter carrier attachment 510 has at least one filter carrier element 511, at least one air inlet opening 514 and at least one filter element 516 which is allocated to the air inlet opening 514, can be designed in such a way that the filter carrier attachment 510 has at least one connecting element 514 which can be fastened in a housing gap 505 of the housing 502 of the hand-held power tool.

7. In an alternative embodiment, the hand-held power tool 500, with a filter carrier attachment 510 according to 6, can be designed in such a way that the connecting element 512 is designed as a retaining element 512.

8. In a further embodiment, the hand-held power tool 500, with a filter carrier attachment 510 according to 6. or 7, can be designed in such a way that the connecting element 512 is accommodated in the housing gap 505 in a clamped manner between two housing elements of the housing 502 of the hand-held power tool 500.

9. In an alternative embodiment, the hand-held power tool 500, with a filter carrier attachment 510 according to 6. to 8, can be designed in such a way that the filter carrier attachment 510 has at least two retaining elements 512 on its side edges, especially arranged on opposite side edges.

The invention claimed is:

1. A hand-held power tool, comprising:
a housing; an electric motor including at least one carbon brush configured to make electrical contact with a collector of the electric motor, the at least one carbon brush is detachably arranged inside the housing and configured to be removed via a housing opening; and
a housing cover configured to cover the housing opening, the housing cover configured as a detachable part of the housing, and the housing cover including at least one air inlet opening configured to supply the electric motor with cooling air.

2. The hand-held power tool as claimed in claim 1, further comprising:
at least one filter element is arranged at the at least one air inlet opening and configured to prevent ingress of material particles and dust into the housing of the hand-held power tool.

3. The hand-held power tool as claimed in claim 2, wherein the at least one filter element is configured to be detachably fastened to the housing cover.

4. The hand-held power tool as claimed in claim 1, wherein the at least one air inlet opening is arranged in the vicinity of the at least one carbon brush.

5. The hand-held power tool as claimed in claim 1, further comprising:
at least one fastening element configured to connect the housing cover to the housing.

6. The hand-held power tool as claimed in claim 1, wherein the housing cover further comprises:
a cover element configured to fasten the housing cover to the housing; and
a filter retaining element configured to be detachably fastened to the cover element.

7. The hand-held power tool as claimed in claim 6, wherein the cover element and the filter retaining element have an air inlet opening of the at least one air inlet opening.

8. The hand-held power tool as claimed in claim 6, further comprising:
a filter element accommodated between the filter retaining element and the cover element.

9. The hand-held power tool as claimed in claim 6, wherein the filter retaining element is configured as one piece with the cover element.

10. The hand-held power tool as claimed claim 1, wherein the housing cover is configured as one piece with a filter carrier attachment.

11. The hand-held power tool as claimed in claim 3, wherein the at least one filter element is configured to be detachably fastened to the housing cover by clipping in or by adhesive fastening.

12. The hand-held power tool as claimed in claim 4, wherein the at least one air inlet opening is arranged radially on an outside of the carbon brush.

13. The hand-held power tool as claimed in claim 5, wherein the at least one fastening element is a screw and/or a snap-in element.

14. The hand-held power tool as claimed in claim 8, wherein the filter element is accommodated between the filter retaining element and the cover element in a detachable manner.

* * * * *

UNITED STATES PATENT AND TRADEMARK OFFICE
CERTIFICATE OF CORRECTION

PATENT NO. : 10,525,581 B2  
APPLICATION NO. : 15/775985  
DATED : January 7, 2020  
INVENTOR(S) : Florian Esenwein et al.

Page 1 of 1

It is certified that error appears in the above-identified patent and that said Letters Patent is hereby corrected as shown below:

In Claim 1, at Column 7, Line 56, delete the word "is" between the words "brush" and "detachably".

In Claim 2, at Column 8, Line 8, delete the word "is" between the words "element" and "arranged".

Signed and Sealed this  
Seventh Day of April, 2020

Andrei Iancu  
*Director of the United States Patent and Trademark Office*